United States Patent [19]

Fargher et al.

[11] Patent Number: 5,586,021
[45] Date of Patent: Dec. 17, 1996

[54] METHOD AND SYSTEM FOR PRODUCTION PLANNING

[75] Inventors: Hugh E. Fargher, Allen; Richard A. Smith, Garland, both of Tex.

[73] Assignee: Texas Instruments Incorporated, Dallas, Tex.

[21] Appl. No.: 857,018

[22] Filed: Mar. 24, 1992

[51] Int. Cl.⁶ .................................................. G06F 19/00
[52] U.S. Cl. .............................. 364/468.06; 364/468.28; 395/207
[58] Field of Search .................................. 364/401, 468; 395/900, 926, 61

[56] References Cited

U.S. PATENT DOCUMENTS

| | | | |
|---|---|---|---|
| 4,796,194 | 1/1989 | Atherton | 364/468 |
| 5,040,123 | 8/1991 | Barber et al. | 364/401 |
| 5,053,970 | 10/1991 | Kurihara et al. | 395/926 |
| 5,099,431 | 3/1992 | Natarajan | 364/468 |
| 5,128,860 | 7/1992 | Chapman | 364/401 |
| 5,148,370 | 9/1992 | Litt et al. | 395/926 |
| 5,212,791 | 5/1993 | Damian et al. | 395/926 |
| 5,214,773 | 5/1993 | Endo | 395/61 |

OTHER PUBLICATIONS

"Stochastic Neural Networks for Solving Job–Shop Scheduling: Part 1, Problem Representation", Foo et al., IEEE Inter. Conf. on Neural Networks, Jul. 24–27, 1988, pp. II–275 through 282.

"Stochastic Neural Networks for Solving Job–Shop Scheduling: Part 2. Architecture and Simulations", Foo et al. IEEE Inter. Conf. on Neural Networks, Jul. 24–27, 1988, pp. II–283 through 290.

R. Kerr & R. Walker: "A Job Shop Scheduling System based on Fuzzy Arithmetic", Proc. of 3rd Int. Con. on Expert Systems & Leading Edge in Prod. & Operations Man., pp. 433–450, 1989.

Primary Examiner—Donald E. McElheny, Jr.
Attorney, Agent, or Firm—W. Daniel Swayze, Jr.; W. James Wade, III; Richard L. Donaldson

[57] ABSTRACT

A method for planning a production schedule within a factory is disclosed herein. A capacity model is determined for the factory. The capacity model is determined by determining a plurality of contiguous time intervals, partitioning the factory into a plurality of resource groups, and determining a processing capacity for each of the resource groups for each of the time intervals. For each job to be planned, the job is divided into a plurality of processing segments each of which is represented with a corresponding fuzzy set. The fuzzy set representations are inserted and removed within the capacity model until the job is planned. A completion date and a confidence level can be predicted for each of the jobs. In addition, the jobs may be released to the factory and devices fabricated according to the requirements of the jobs. Other systems and methods are also disclosed.

19 Claims, 5 Drawing Sheets

$$CT \quad \text{Where}$$
$$CT = \frac{CT+CT+CT+CT}{CT}$$

METHOD AND SYSTEM FOR PRODUCTION PLANNING

This invention was made with government support under contract no. F33615-88-C-5448 awarded by the United States Air Force. The government may have certain rights in this invention.

FIELD OF THE INVENTION

This invention generally relates to the fabrication systems and more specifically to a method and system for production planning.

BACKGROUND OF THE INVENTION

Production planning is the process of choosing work to be started in a manufacturing facility during some future time period so that performance is maximized. Work is usually selected from a variety of product types which may require different resources and serve different customers. Therefore, the selection must optimize customer-independent performance measures such as cycle time and customer-dependent performance measures such as on-time delivery.

The reasons for requiring advanced production planning may be unique to each manufacturing facility. For example, one facility may require advanced planning so that materials may be ordered and delivered in time for manufacture. Another facility may require advanced planning in order to make delivery commitments or predict delays in product delivery.

In order to configure a production plan which yields the best performance, the capacity, or the amount of work the facility can handle, must be modeled in some fashion, since starting work above the capacity of the facility compromises performance and brings forth no benefits. Conventional factory capacity models employ simple steady-state linear relations that include: (1) the average amount of available work time for each machine in the factory and (2) the amount of work each product requires of each machine. From the above linear relations, a given start plan is within capacity if, for each machine, the total required amount of work is: (1) less than the machine's available time, and (2) multiplied by a predetermined fraction goal utilization of the start rate.

There are several problems associated with a linear production planning program. Because of the large problem size, variables in linear programs must be expressed in non-integer quantities in order to yield good solutions. As a result, fractional start quantities may be generated which must be converted into discrete start quantities. Such forced conversion sacrifices the goodness of the solution.

The large problem size presents another obstacle for prior production planning programs. The problem size may prohibit efficient solution via conventional programming algorithms. This problem has not been overcome in the industry without substantial loss of optimality in the solution.

In addition, many present programs are run only at fixed intervals of time, for example, weekly. This creates the problem that if a machine goes down early in the week, the remainder of the schedule is no longer valid.

Accordingly, improvements which overcome any or all of the problems are presently desirable.

SUMMARY OF THE INVENTION

Other objects and advantages will be obvious, and will in part appear hereinafter and will be accomplished by the present invention which provides a method and system for production planning.

A description of a manufacturing planning system which can be used to recommend work released for processing, and to predict work completion dates to a predefined level of confidence, given the current state of a factory is provided herein.

Planning work release and completion for a factory is difficult due to the problem of representing such a complex environment at a level which is computationally tractable, and to the uncertainty in manufacturing parameters such as processing cycle times. The present invention describes a way of representing the manufacturing plan in a tractable way, as well as reasoning with uncertain parameters such as work cycle time.

The plan is represented by the processing capacity of each resource group in the factory, divided into contiguous time intervals, together with the work planned for each time interval. Work is represented within time intervals by the total processing committed by each resource group. No sequencing of work is performed within a time interval. This may be referred to as a 'time-phased' model.

Each job to be planned, which may have an estimated total cycle time of many time intervals, is represented by first dividing the required processing into discrete segments, where each segment represents processing on resources which may be completed within one time interval of the plan representation. Division of processing into segments is performed by calculating which segment each processing step would lie in if processing were evenly distributed over the entire cycle time.

Processing is then redistributed between segments using a fuzzy set algorithm. To do this, segments are interpreted as a fuzzy set, where resource group utilization for a given job has a degree of membership within each time interval, reflecting the expected utilization of resources for the job during the time interval.

The fuzzy set algorithm attempts to decompose the final cycle time probability distribution (gathered from simulated or historical data) into cycle time distributions for each successive time interval for a given jobs processing. This is performed so that 1) interval cycle time distribution variance increases with successive intervals, to reflect increasing future uncertainty; 2) interval cycle time variance is bounded by the final cycle time variance; and 3) the final computed interval cycle time distribution matches the input cycle time distribution.

The algorithm does this using standard fuzzy arithmetic operations. Once time interval cycle time distributions have been calculated for a given jobs processing route, they are used to 'fuzzify' the resources committed to each segment using the standard fuzzification operator.

Planning is performed by inserting and removing segments (which represented a jobs required processing, 'smeared' out to reflect the uncertainty in interval cycle times) from the plan representation time intervals. This is achieved using a modified beam search with chronological back-tracking. Maximum beam width is determined by the ratio of measured job cycle time to minimum theoretical cycle time. The search is further reduced by constraining the beam width to increase linearly with search depth.

One advantage with this method is that solutions which appear unpromising at an early stage in the search are quickly discarded, whereas those which appear more promising are more thoroughly searched. Another advantage is that 'disjoint' plan representations, in which no resources may be available for an extended period of time due to factory shut-down, do not prevent new work from being planned, as long as sufficient processing capacity exists within the plan representation.

Once work has been planned for a given processing route, the final cycle time distribution is used to quote the completion date to within a given confidence level. For example, if 50% of the final time interval processing has been planned to complete by Friday, the job may be quoted to complete on Friday within a 50% confidence level.

The present invention provides many advantages over prior art methods. Since no sequencing is performed within time intervals, interval size may be used to 'tune' the planner to work at different levels of detail. For example, if all time intervals were shorter than the shortest processing step, the plan representation would reduce to a Gantt chart.

In addition, complex manufacturing environments can be represented within a plan in a computationally tractable form.

Further, uncertainty, given by parameters such as cycle time distributions, may be represented and reasoned with in the plan. This means that planned completion dates may also be quoted to any given confidence level.

Still further, the beam-search mechanism used to plan work can be used to concentrate on promising solutions first, cutting down the total planning time. The mechanism also allows planned jobs to 'straddle' parts of a disjoint capacity model during which no resources are available for processing.

BRIEF DESCRIPTION OF THE DRAWINGS

The above features of the present invention will be more clearly understood from consideration of the following descriptions in connection with accompanying drawings in which.

Corresponding numerals and symbols in the different figures refer to corresponding parts unless otherwise indicated.

DETAILED DESCRIPTION OF PREFERRED EMBODIMENTS

Figure 1:
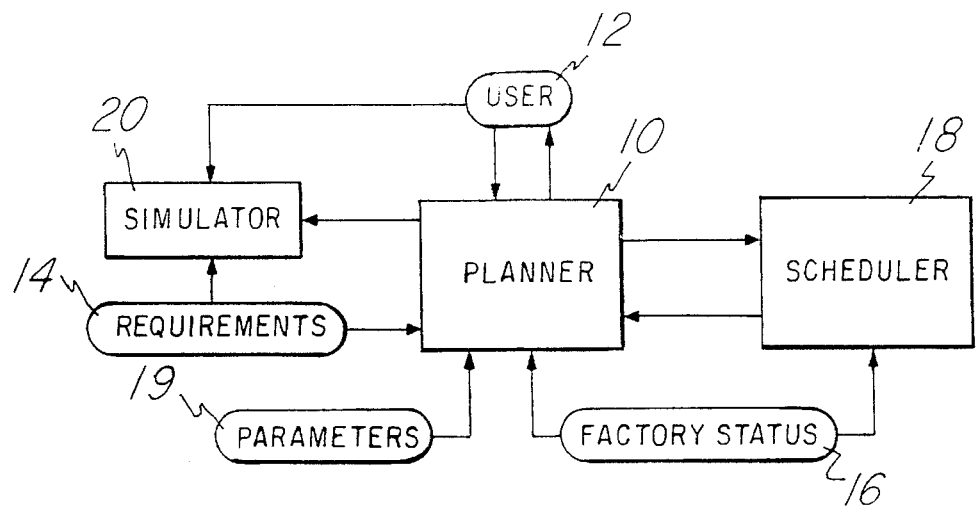
FIG. 1 is a simplified block diagram of the planner of the present invention in relation to some of the other functions.

The making and use of the presently preferred embodiments are discussed below in detail. However, it should be appreciated that the present invention provides many applicable inventive concepts which can be embodied in a wide variety of specific contexts. The specific embodiments discussed are merely illustrative of specific ways to make and use the invention, and do not delimit the scope of the invention.

The following is a description of the system and method of the present invention. An overview of the preferred embodiment along with a brief description of the operating environment will be described first. The algorithm and unique concepts will then be discussed. Experimental results will then be discussed followed by a general description of possible hardware implementations.

Work is presently being done to develop the next generation of semiconductor wafer fabrication systems. Several revolutionary concepts are being pioneered including new single-wafer rapid thermal processes, in-situ sensors, cluster equipment, and advanced Computer Integrated Manufacturing (CIM) software. One of the objectives is to develop a manufacturing system capable of achieving an order of magnitude improvement in almost all aspects of wafer fabrication.

An important part of future manufacturing systems is the development of the CIM environment responsible for coordinating all parts of the system. The CIM architecture may be based on a distributed object oriented framework made of several cooperating subsystems. Software subsystems may include: Process Control for dynamic control of factory processes; Modular Processing System for controlling the processing equipment; Generic Equipment Model which provides an interface between processing equipment and the rest of the factory; Specification System which maintains factory documents and product specifications; Simulator for modelling the factory for analysis purposes; Scheduler for scheduling work on the factory floor; and the Planner for planning and monitoring of orders within the factory.

The present invention is directed toward a novel method and system for performing the planning function. Although described herein using a semiconductor wafer fab as the primary example, the present invention may be applied to any manufacturing environment. It is stressed that the semiconductor fabrication is used only as an example.

Many functions of a planner (typically implemented by software in a computer system) will be discussed herein. All or only some of these functions may be incorporated depending on the system requirements. In addition, other functions may be added without altering the method and system described herein.

In general, the function of the planner is to take a set of input requirements such as device types, lot sizes and due dates and plan the utilization of the factory. Typically, the planner will output information such as start dates and projected completion dates for each lot. As an aspect of the present invention, the projected completion date can be predicted within a given confidence level. Given a list of lots waiting to enter the factory, one of the functions of the planner may be to determine the order in which the lots should begin. Another piece of software referred to as a scheduler, could be used to determine the specific machine loadings. Alternatively, the scheduling function can be incorporated within the planner (although currently this would be very cumbersome, and it is not expected to be practical until faster computing methods are developed. In yet another embodiment, the scheduling function can be performed by a person who decides the exact machine loadings at any given time.

Referring first to FIG. 1, a simplified block diagram of the planner 10 in relation to some of the other functions is illustrated. In general, the planner 10 receives inputs from the user 12, from the manufacturing requirements 14 and from the factory 16. Also, an parameters input 19 may exist to provide information for the planner 10. The planner 10 may also interact with a scheduler 18 and/or a simulator 20.

The requirements 14 may comprise information such as the type of device, the required process flow, the quantity of devices required and possibly the due date. Other bookkeeping type information such as an account or lot number, the customer or the requesting group may also be included.

The factory status 16 may include information such as the status of various factory resources such as machines or operators. For example, if a machine is going to be down for a given amount of time or an operator is out sick, it may be necessary to replan the schedule. Other information such as the progress of lots within the shop and status of the work in progress (WIP) are also input to the planner.

The user 12 will require access to the planner to obtain status information on given lots. The status information may include such things as start date and estimated completion date (along with a confidence level).

The planner 10 may also have the ability to perform "what-if" scenarios. In other words, information can be added to determine what would happen if a certain action were to occur. Examples of these actions would be determining the impact if a machine (or machines) were to go down, if over-time shifts are added, if orders are added or deleted or if the priority of existing orders is changed. In one aspect, the planner may be able to give the optimal time for a machine to go down for scheduled maintenance.

Along with the outputs previously described, the planner 10 should provide the work starts to the scheduler 18. For the purposes of this invention, the implementation of scheduling function is not critical. For example, the scheduler 18 can be a piece of software which tracks and directs the flow of work product through the factory. In another example, the scheduler 18 can be a person who manually performs these functions. In this case, the user 12 and the scheduler 18 may (or may not) be the same person (or group of people).

Also illustrated in FIG. 1 are the input parameters 19. The input parameters 19 may include inputs such as the interval size, the horizon and other parameters which are utilized by the software as described below.

The following is a description of the relationship between the planner 10, the scheduler 18 and the simulator 20 for the preferred embodiment system. One role of the planner 10 is to plan and predict work completion dates, given a required confidence level, set of plan goals, and the current state of the factory. This requires that the plan representation model factory resource utilization over time, and that the plan be continually updated to reflect unexpected events such as machine failure. This role is not provided by the scheduler 18, which performs more locally based decision making.

As part of this role, the planner 10 is able to warn the user 12 of the impact of unexpected events. For example, the planner 10 can determine whether work completion dates are slipping, well in advance of their quoted delivery dates. The user 12 can also be warned of any work which has been automatically replanned due to unexpected events, so that they may request changes to the plan if required. Automatic replanning of work may be an option to be invoked if desired by the user.

The ability to request plan changes is another key planner role which is not provided by the scheduler 18. "What-if" plan changes refer to requests such as putting a machine on hold or introduction of new work, as examples.

Finally the planner 10 constrains work release into the factory, based on the current plan being executed. This is important since early release of work carries the penalty of increased WIP and early completion of work is undesirable. In most cases, the high level plan representation does not allow the planner 10 to determine the precise moment for work release, which may be based on low level factory data such as machine queue sizes.

This is an important role for the scheduler 18, since work released early will only increase WIP by placing work on a queue. Work release is accomplished by the scheduler 18 requesting more work from the planner 10, with the planner 10 satisfying the request as best as possible given the work planned for release over the next chosen time interval.

Another role of the scheduler 18 is to make sequencing decisions for work on the factory floor, based on details such as queue sizes, machine setups, and so forth. Although such decisions may be based on currently planned ship dates, this service cannot typically be provided by the planner 10 (which, in the preferred embodiment, does not distinguish between identical resources in the plan representation). Finally, the scheduler 18 is responsible for tracking work in process.

The planner 10 influences the schedule being executed by constraining work release and predicting work completion dates, which may be used in scheduler 18 dispatch decisions. However, work released into the factory cannot be directly influenced by the planner 10. The scheduler 18 provides important feedback to the planner 10 by tracking work in process. This can be used to update cycle time estimates used by the planner 10, and to warn of tardy work which may cause replanning.

Some systems may also include a simulator 20. Both the planner 10 and simulator 20 systems provide the user 12 with the ability to determine the consequences of "what-if" requests. However, the allowed requests differ fundamentally between the planner 10 and simulator 20.

In the preferred embodiment, planner 10 "what-if" requests may be made on a single plan only, and result in incrementally updating the existing plan to satisfy the request. Typically, the existing plan reflects the current state of the factory. Rapid feedback is required, since the requests may refer to the effect of putting a machine down in the near future for maintenance, or the effect of introducing a new hot lot onto the factory floor. These requests must be rapidly evaluated if a manager is to fully benefit, since they may require immediate attention. The ability to have multiple "what-i" plans open simultaneously will also be important if possible plan options are to be compared.

In contrast to this, simulator 20 "what-if" requests are typically performed by running a suite of simulations, using factory conditions possibly selected at random from a set of work release or machine failure distributions. Feedback is not required immediately since simulation results typically refer to changes which are not immediately put into practice. Example requests may include the effect of introducing new machines into the factory or re-training several of the operators.

In the preferred embodiment, the planner 10 system may interact with the simulator 20 in two distinct modes. First, the planner 10 may provide a static work release plan, generated using some initial factory status, which provides the simulator 20 with a work release time table. This is particularly important for verifying the plan model and algorithms, since simulated work completion should match plan predictions if the planner 10 is correctly predicting processing capacity. Second, the planner 10 may provide a dynamic release plan, which is updated in response to simulated events (such as machine failure) during simulation execution. This is important for verifying planner 10 response times, which must remain small if the planner 10 is to be truly "reactive".

Figure 2:
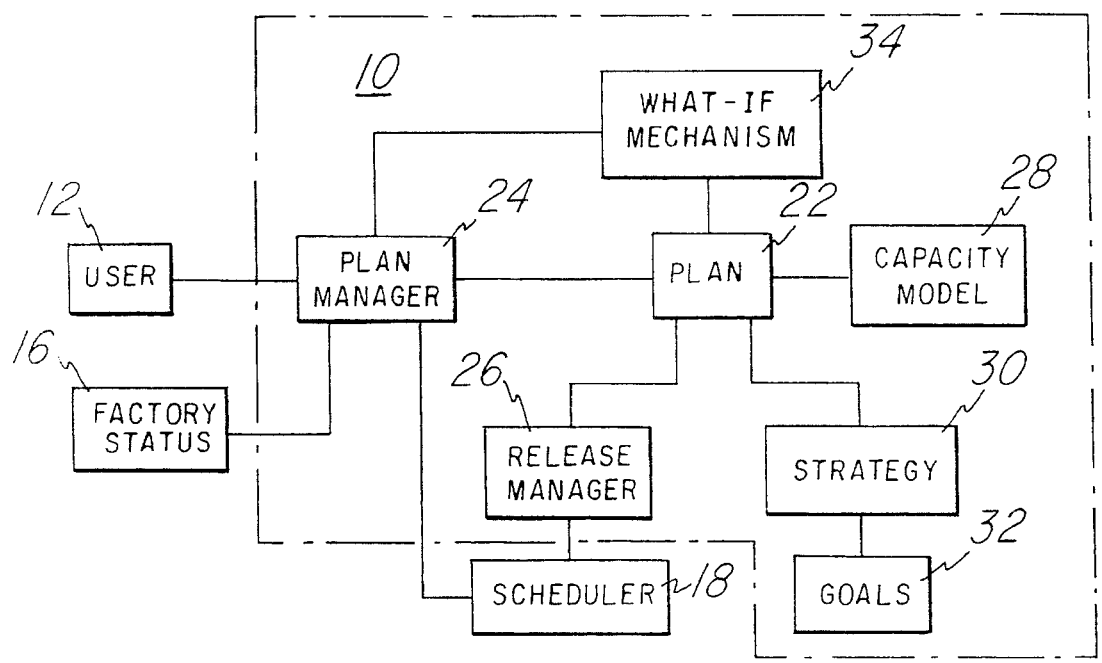
FIG. 2 is a block diagram of the relation of some of the functions within the planner.

FIG. 2 illustrates a more detailed view of the implementation of the planner 10. In the preferred embodiment, the planner 10 is implemented in an object oriented software language such as Smalltalk. Other software languages such as C, Basic, Pascal, Fortran, or even assembly language may also be used.

As illustrated in FIG. 2, the planner 10 comprises numerous subblocks or objects. These include the plan 22, the plan manager 24, the release manager 26, the capacity model 28, the strategy 30, the goals 32 and the what-if mechanism 34. The relationship of these blocks as well as other blocks is described hereinbelow.

The present invention utilizes a plan representation which has been chosen to model the manufacturing environment in enough detail to achieve the planning functions, while allowing incremental updates due to replanning. The following discussion outlines the representation, along with the search algorithm used to generate and update plans.

The plan representation is based on the processing capacity of resource groups within the factory, divided into contiguous time intervals. Each resource group has an associated set of processing capabilities which every member of the group is able to perform. Since a single semiconductor manufacturing machine may perform several different processes, a machine may be a member of several different resource groups. A method for determining usage of resources in a multi-task, multi-resource environment is described in co-pending application Ser. No. 07/785,836 filed Oct. 31,91 and incorporated herein by reference. Each resource group is represented over contiguous time intervals, where the planned processing commitment and remaining capacity is recorded.

The plan representation does not distinguish which resource, within a resource group, is planned to process a particular piece of work represented within a plan. The representation simply commits processing time for the whole resource group to a particular piece of work. Furthermore, the plan representation does not sequence processing within each time interval, only between time intervals. In this way, the level of detail modelled by the plan is a function of both resource groups and time interval sizes. If resource groups contained only one resource, and all time intervals were shorter than the shortest processing step, the plan representation would reduce to a Gantt chart describing the processing schedule for each resource. If, on the other hand, the entire plan were covered within a single time interval, the representation would reduce to the model frequently used for planning within semiconductor manufacturing. The "time-phased" representation outlined above lies somewhere between the two extremes. The plan representation must accurately reflect factory capacity, projected forward from the current clock time. To ensure this, all planned processing for the earliest time interval is removed from the plan representation when the clock time exceeds the time interval upper bound. Planned processing is then compared with the current state of the factory (via the WIP tracking system) and the system user is warned of any work which appears tardy on the factory floor. Finally, the processing capacity of resource groups within the first plan time interval reduce linearly with time, to reflect the constantly increasing clock time.

Figure 3A:
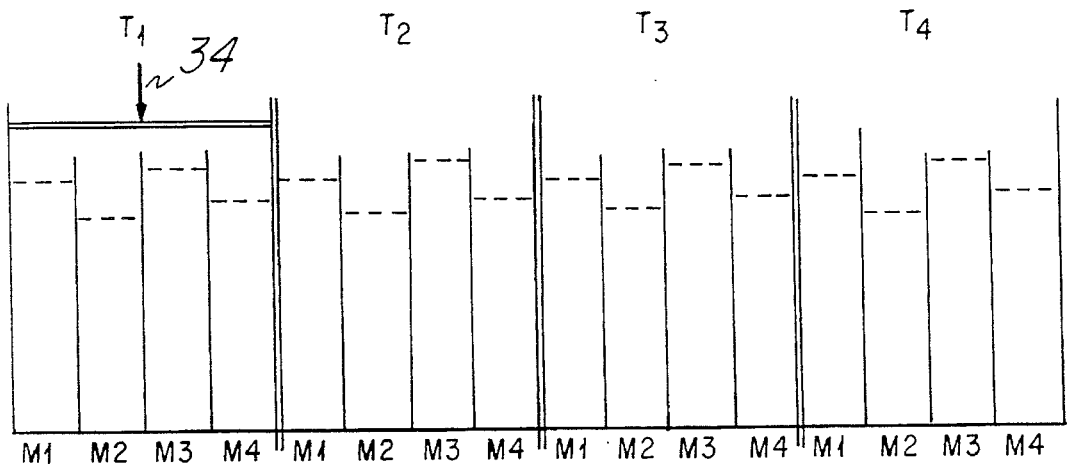
FIG. 3a and 3b are illustrations of the capacity model used in conjunction with the present invention.

A diagrammatic illustration of the capacity model is presented in FIG. 3a. This simplified representation illustrates a model which includes four time intervals $T_1$–$T_4$ and four machine resource groups $M_1$–$M_4$. The time intervals $T_1$–$T_4$ are of equal duration in the preferred embodiment since this feature simplifies the calculations. However, in general, this requirement is not necessary. In fact, in certain embodiments it may be desirable to vary the length of the time intervals. For example, it may be desirable for the earlier intervals to be of a short duration (e.g., a few hours) and the later intervals to be of a longer duration (e.g., a few days or even weeks).

In the illustrated example, the horizon (or total sum of the intervals) is 4 units (e.g., 4 days). The larger the horizon, the farther in advance planning can take place. However, as will be discussed hereinafter, the precision of predicting completions a long time in the future is poor and therefore a long horizon is not practical.

In a typical example, the time intervals may each be one day and the horizon may be 30 days. It is once again noted that tradeoffs must be made as to the length of the intervals (and therefore, the precision of the predictions) and the computational requirements of the system.

In an alternate embodiment, multiple plan horizons can be planned simultaneously. For example, a capacity model may include one day time intervals for up to 30 days, one week time intervals for up to three months and two week time intervals for up to six months.

As mentioned, in the illustrated example, there are four resources or resource groups $M_1$–$M_4$. Each resource group has a goal utilization. For example, if a resource group included two machines and was planned to be operated for two eight-hour shifts, that were operating 90% of the time, the goal utilization would be 28.8 hours (2 machines ×8 hours/machine ×90%). In the illustrated example, the goal utilizations are the same for each time interval. This, however, is not a necessary requirement. For example, if a machine has weekly planned maintenance, the goal utilization would account for this.

Also illustrated in FIG. 3a, is an arrow 34 which is included to emphasize that the available time on a given machine decreases as the current time interval goes on. For example, half way through an eight-hour shift, there are obviously only four hours remaining. The model must account for this. This holds true except when the time intervals are very small and therefore quickly ending. However, small time intervals are presently computationally cumbersome and therefore not practical. This fact may change as computer systems become faster and less expensive.

When the time interval is completed, the system will purge the current interval and begin counting down on the next interval. The purge will occur when the capacity of the current time interval upper bound is exceeded by the real clock time. At this point, another time interval is added to the end and the first time interval (i.e., the just completed time interval) is removed. This sequence maintains the same plan horizon. At this point in time, it may also be beneficial to review the work status and replan those lots that are behind.

The following is a description of the planning algorithm. The planning algorithm is divided into two parts, that of: 1) determining the sequence of work to be planned (given its due-date, customer priority, etc.), and 2) incorporating the required processing into the plan representation (.given the current resource group commitments, type of planning requested, and constraints imposed on which time intervals processing may be planned for). Planning may use the existing plan representation as a starting point, or some user defined variation if multiple "what-if" plans are to be explored.

Deciding the sequence of work to be planned ultimately determines the overall product mix, and is determined by an ordered list of goals in which the first unsatisfied plan goal is used to sequence work for planning. The ordered goal list may be thought of as defining the planner "strategy". Each goal sequences work using its associated heuristic, which is designed to guide plan generation in favor of satisfying the goal. All goals have numerical values, which must be met by the plan if the goal is to be satisfied. Once a goal is satisfied, processing moves to the next unsatisfied goal. By "interleaving" similar goals in the ordered list, the planner strategy can be used to satisfy several different goals, while ensuring that the plan never deviates much from satisfying any one goal.

The priority of any given order is usually indicated by the user. Typically, there are two types of requests: disruptive and non-disruptive. With a disruptive request, lots which have been previously planned may be removed from the plan and replanned for a later date. On the other hand, non-disruptive requests are fit into schedule without changing any previously planned items. Clearly, the disruptive requests would be saved for the higher priority items.

Based on experimentation, a non-disruptive request may take five seconds or less to plan whereas a disruptive request may take as long as forty seconds. Clearly these times are dependent upon the hardware and software utilized as well as the magnitude of the planning requirement and are provided only for relative comparison.

Typically the lots will be requested to be completed either as soon as possible (ASAP) or by a given due date. If the order is requested for completion ASAP, the algorithm would begin with the present time interval and move forward in time until it could be planned. This request can be indicated as either disruptive or non- disruptive.

On the other hand, with an order requested for completion by a due date, the algorithm would first determine the minimum cycle time and plan the first item accordingly. The algorithm would then go back in time to try to plan each step until the entire process flow was planned. Once again, this request can be indicated as either disruptive or non-disruptive.

Once work has been sequenced for planning, it must be incorporated into the time-phased plan representation. The resources required for each processing step must be committed over some time interval so that no resource group is overutilized and all constraints on processing are satisfied. Plan independent constraints, such as processing times and required resource groups, are determined by querying the specification system. Within these constraints, the planning search algorithm determines precisely in which time interval to commit resource groups for each processing step.

The planning search algorithm uses a work representation in which wafer processing is divided into discrete segments, where each segment represents processing on resources which may be completed within one time interval of the plan representation. Division of wafer processing into segments is performed by calculating which segment each processing step would lie in if processing were distributed evenly over the entire wafer cycle time. Since the wafer cycle time is greater than the minimum theoretical processing time, such a representation accounts for the expected queue time during wafer processing. Each search operation either inserts or removes segments from the plan representation, terminating when all required segments for processing work have been inserted, or when no further processing capacity remains.

The search algorithm uses a modified beam search with chronological back-tracking. Maximum beam width is determined by the ratio of measured wafer cycle time to minimum theoretical cycle time, since the greater the ratio, the greater the choice of time intervals for planning each processing segment. The search space is further reduced by constraining the beam width to increase linearly with search depth. One advantage of this is that solutions which appear unpromising at an early stage in the search are quickly discarded, whereas those which appear more promising are more thoroughly searched. Another advantage is that "disjoint" plan representations, in which no resources may be available for an extended period of time due to factory shut-down, do not prevent new work from being planned, as long as sufficient processing capacity exists while the factory is operational.

Replanning due to unexpected resource failure requires reasoning at both the goal list and the search algorithm level. To ensure that resource groups are not overutilized in the plan representation when a resource goes down, currently planned work must be sequenced for replanning. This is performed by removing work until resource utilization levels are not exceeded, and then replanning this work to be released at a later date.

Figure 3B:
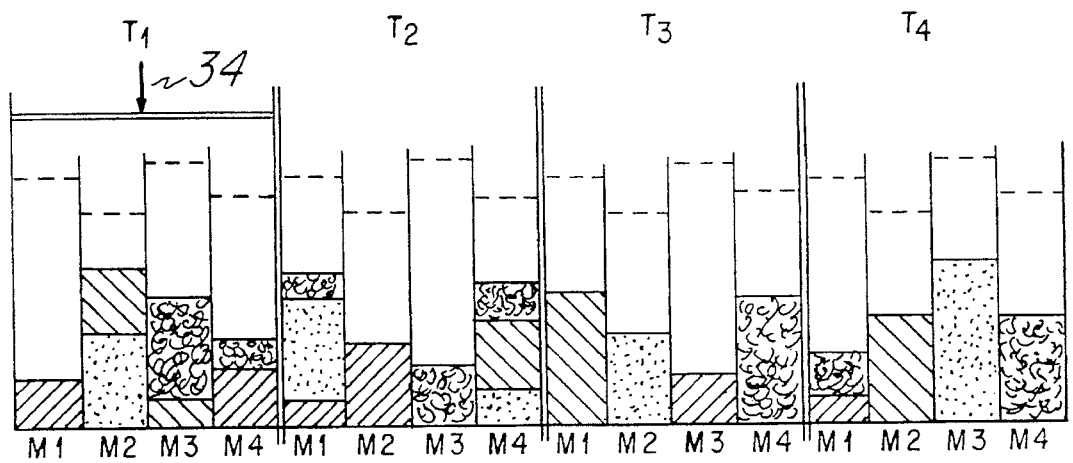

As an example, the capacity model of FIG. 3a has been partially loaded and is illustrated in FIG. 3b. In this example, four lots (differentiated by the different cross hatching) have been loaded into the model. As illustrated, a lot may be planned on more than one resource during a given interval or may be on any resource during a given interval. The goal is to load each resource to its goal utilization and also complete each lot by its required due date.

This algorithm has been tested experimentally. Table 1 illustrates performance when using this algorithm to plan new work into an existing plan. The table shows the fraction of successful search nodes (for which a processing segment was successfully inserted into the plan representation), failed nodes (for which there was not enough processing capacity in the attempted time interval), and backtracked nodes. The results illustrate that even for a highly utilized factory the search required to plan new work, for which there is processing capacity available, is not prohibitive. Furthermore the percentage of backtracked nodes does not continue to increase with committed utilization. In a semiconductor fabrication facility an average of 80% utilization across all machines is considered very high. The results in this case assume that human operators are not a bottleneck resource.

TABLE 1

| Committed Utilization | Successful Node Percentage | Failed Node Fraction | Backtracked Node Fraction |
|---|---|---|---|
| 10% | 100% | 0% | 0% |
| 20% | 100% | 0% | 0% |
| 30% | 47% | 40% | 13% |
| 40% | 44% | 44% | 12% |
| 50% | 36% | 50% | 14% |
| 60% | 35% | 52% | 13% |
| 70% | 32% | 56% | 12% |
| 80% | 30% | 58% | 12% |

The plan representation must ideally also be able to model the uncertainty inherent in work cycle-times, since such cycle-times often form the best available data for planning. The following discussion outlines the approach taken to representing uncertainty in the planning process. Two areas of uncertainty are tackled by the planner, both corresponding to data which is represented by a probability distribution. The first is wafer yield, which is recorded as the probability of manufacturing a number of good chips given the starting number. The second is cycle time, which is recorded as the probability of completing all manufacturing steps on a wafer in a given time. This discussion outlines how cycle time distributions are used within the planner.

One objective of the planner is to predict work completion dates to within some given confidence, which may be used to negotiate with customers. For example, an order may be represented within the plan so that it completes processing on Friday to within a 50% confidence level, but on the following Monday to within an 80% confidence level.

Uncertainty is modelled within the planner by reinterpreting the plan representation in terms of fuzzy sets. Resource group utilization for a given piece of work has a degree of membership within each time interval, which reflects the expected utilization of resources for this work during the time interval. For example, the total cycle time distribution for wafer processing may be interpreted as the probability distribution for completing the final processing step at a given time. This can be modelled within the plan representation by assigning degrees of membership between time intervals to match the given probability distribution for the final processing step. The advantage gained by this interpretation is two-fold. First, computation on fuzzy sets is much less expensive than on probability distributions. Second, cycle time uncertainty within the time-phased representation means that resources committed to processing a given set of wafer steps within one time interval will very likely process some of those steps within other time intervals. This closely matches the concept of membership degree within fuzzy set theory.

Figure 4A:
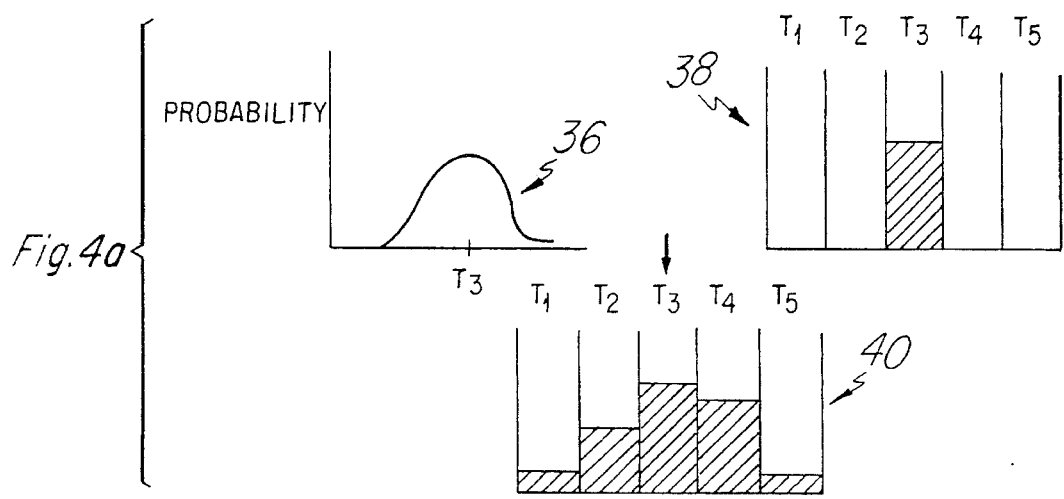
FIGS. 4a and 4b illustrate conceptually the method of "smearing" a task over several time intervals.
Figure 4B:
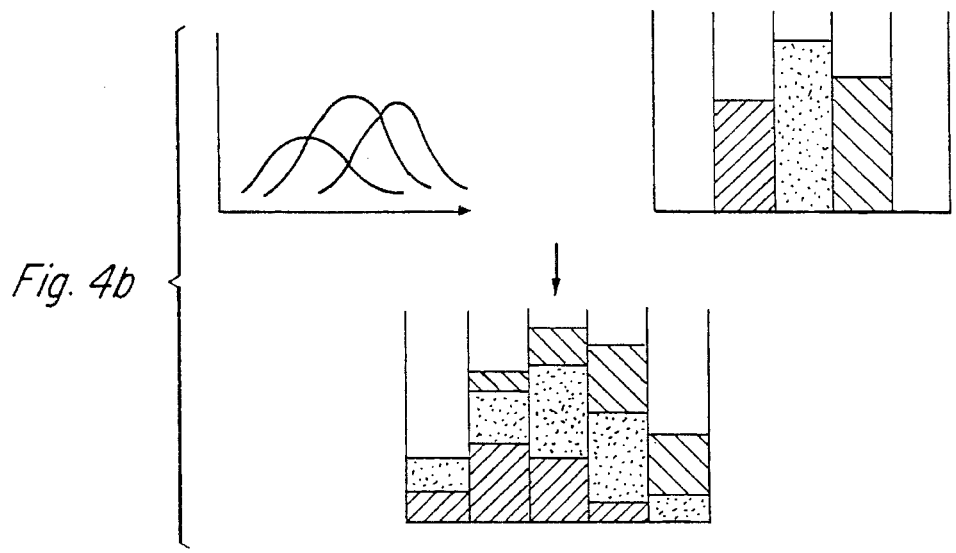

FIGS. 4a and 4b diagrammatically illustrate how a lot can be "smeared" over several intervals. In this simplified example, there is only one task to perform and only one resource available. In this case, the probability density function 36 is given (possibly based on historical data). Without considering the probabilistic nature, the task would be scheduled only during time interval $T_3$. However, due to the probabilistic nature (in other words, since you don't really know how long it will take because of machine down time and human factors) the task should be distributed. In this case, it is distributed over five time intervals. As a specific example, assume the task in capacity model 38 is scheduled for eight hours. Without smearing, the capacity model would have eight hours scheduled during time interval $T_3$. However, once smearing is considered, the capacity model is distributed, for example to schedule 0.7 hours during $T_1$, 2.0 hours during $T_2$, 2.7 hours during $T_3$, 2.3 hours during $T_4$ and 0.3 hours during $T_5$. This case is illustrated in the capacity model 40. In a typical situation, the distribution will hopefully be tighter and therefore possibly about 7 hours would be scheduled for $T_3$ and the remaining hour scheduled during other intervals.

FIG. 4b illustrates a similar situation as FIG. 4a with three tasks each having a different probability density function.

To enable the planner to reason at this level of detail, knowledge of the total processing cycle time distribution is required, as well as some estimate of the distributions required to complete each time interval's worth of processing. Intermediate processing steps for which data is recorded in semiconductor manufacturing are traditionally referred to as "log-points". If log-point data were available for processing steps within each planner time interval, this data could be used to model the distributions for required processing over all time intervals. However, this log-point data may not be available for all processing steps, only the final cycle time. For this reason, the planner uses an algorithm to estimate log-point cycle times, given the final cycle-time which is available as a distribution.

The algorithm attempts to decompose the final cycle time probability distribution into cycle time distributions for each successive time interval throughout a wafer's processing. This is done so that:

(i) Interval cycle time distribution variance increases with successive intervals, to reflect increasing future uncertainty.

(ii) Interval cycle time variance is bounded by the final cycle time variance.

(iii) The final computed interval cycle time distribution matches the input cycle time distribution.

The algorithm represents distributions using fuzzy numbers and performs all calculations using fuzzy arithmetic. This approach is based on the job shop scheduling system FSS as described by Kerr and Walker ("A Job Shop Scheduling System Based on Fuzzy Arithmetic", Proc. of 3rd Int. Con. on Expert Systems and Leading Edge in Prod. and Operations Man., pp. 433–450, 1989) which also uses fuzzy arithmetic to model increasing uncertainty in generating future schedules. A key advantage with this approach is that calculations on distributions can be performed extremely rapidly. The algorithm has been tested against simulated results, as described hereinafter.

Once time interval cycle time distributions have been calculated for a given wafer processing route, they are used to "fuzzify" the resources committed to processing steps during each time interval of the plan representation. This is achieved by using the fuzzification operator (defined for fuzzy set theory) and results in resource utilization being "smeared out" within the plan representation. This reflects the uncertainty in the time at which planned processing will actually take place in the factory.

In some manufacturing environments, the fuzzy set (or distribution) of completion at each log point may not be known. In this case, to obtain an approximation of the log point, fuzzy sets can be extrapolated from the known final fuzzy set. This procedure is illustrated graphically in FIGS. 5a–5e.

Figure 5A:
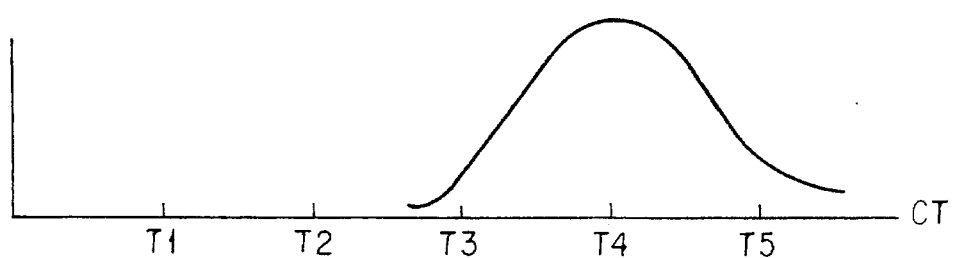
FIG. 5a–5e illustrate how the distribution at a log point can be determined from a known distribution.
Figure 5B:
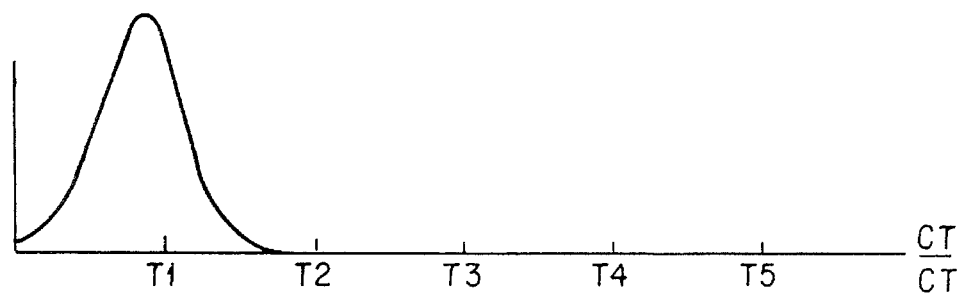
Figure 5C:
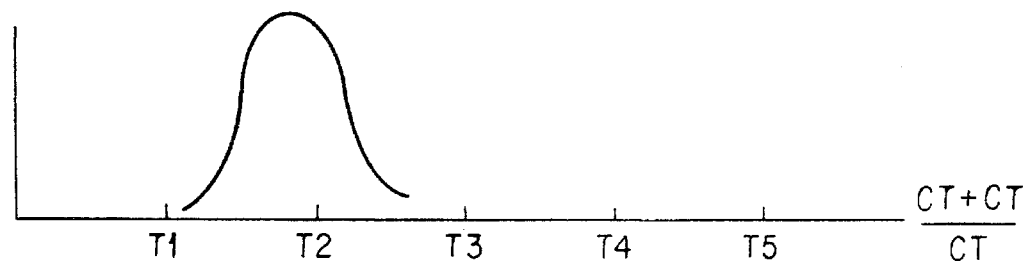
Figure 5D:
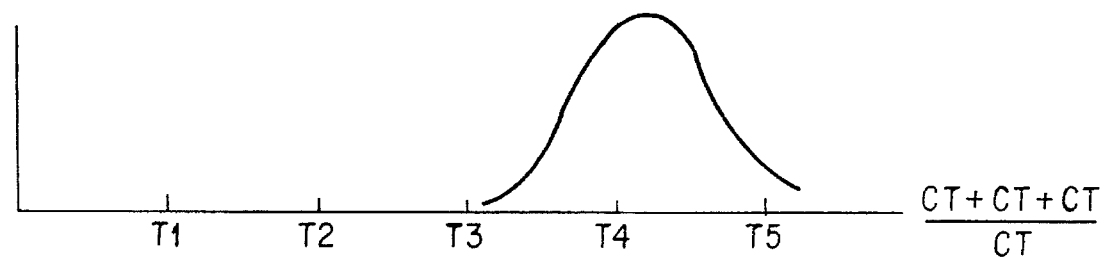
Figure 5E:
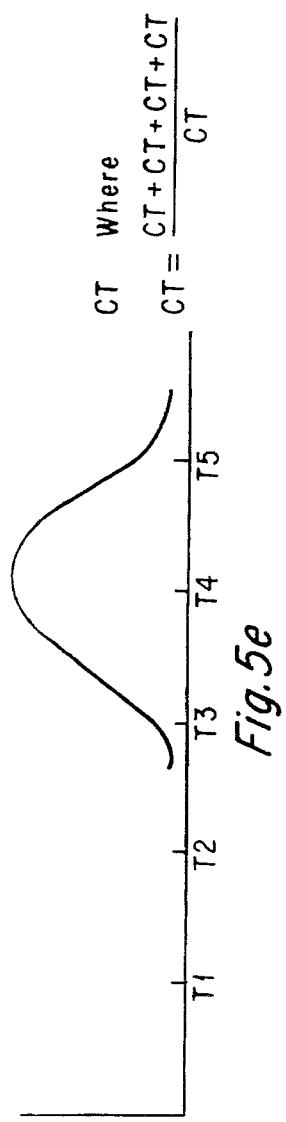

FIG. 5a illustrates a known fuzzy set with a completion time CT. The completion time CT is a fuzzy set and as a specific example may be written as {0.1/3 0.8/4 0.1/5} or in other words completion is expected in about 4 days (with an 90% confidence level, i.e., the sum of the percentages on or prior to 4 days). The fuzzy set of the first day can be computed as CT/CT or about 1 day, as shown in FIG. 5b. For the second interval, shown in FIG. 5c, the completion date is computed as (CT+CT)/CT or about 2 days. As is known from fuzzy set theory, the completion time CT will be smeared or fuzzified with addition operations and therefore the distribution after two days is wider than after one day. This would be intuitively expected since more can go wrong (or right) during the longer time.

Similarly, the completion time after 3 days is calculated as (CT+CT+CT)/CT. This is shown in FIG. 3.

Variations on this algorithm have been tried. For example, the fuzzy number representing the completion time after n days may be altered using the fuzzy "dilate" operation, or a variant on the "dilate" operation, for example where each fuzzy set degree of membership is raised to the power 0.8. This improves agreement between simulated results, and the fuzzy algorithm, and has been used to generate the results in Table 2.

Once work has been planned for a wafer with a given processing route, the final cycle time distribution is used to quote the completion date to within a given confidence level.

For example, if 50% of the final time interval processing has been planned to complete by Friday, the wafer may be quoted to complete on Friday with a 50% confidence level. In fact, the confidence level associated with any delivery date may be quoted.

Finally, measured cycle time distributions provide one important method for feedback to the planner from the outside world. Cycle time distributions may be updated incrementally as wafers complete processing for each type of manufactured technology. Furthermore, since cycle times are closely related to WIP and product mix, distributions used for planning should be chosen to reflect current conditions. However, planning work in semiconductor manufacturing has shown the difficulty in predicting cycle times up-front, which are highly sensitive to conditions such as resource status and WIP levels.

Table 2 illustrates the cycle time mean and variance, for part of a processing sequence completing during a given time interval, calculated using simulation and the proposed fuzzy arithmetic algorithm. The simulated CT mean and variance were calculated by performing a series of simulations, forward in time, based on known time interval cycle time distributions. The resulting final cycle time distribution (at time interval number 5) was then plugged into the algorithm to generate the set of estimated intermediate time interval cycle time distributions. The algorithm estimated time interval distributions were then compared with the simulated distributions by measuring their mean and variance. Time units are measured in numbers of time intervals. Agreement between simulated and fuzzy means remains close, while agreement between simulated and fuzzy variance improves over several time intervals. Agreement improves as CT variance increases due to the greater number of members in the fuzzy number used to represent the distribution. It is anticipated that several possible variations on the algorithm are possible which will improve agreement.

TABLE 2

| Time Interval | Simulated CT mean | Fuzzy CT mean | Simulated CT variance | Fuzzy CT variance |
|---|---|---|---|---|
| 1 | 1.11 | 1.00 | 0.10 | 0.00 |
| 2 | 2.21 | 2.04 | 0.20 | 0.04 |
| 3 | 3.30 | 3.10 | 0.28 | 0.16 |
| 4 | 4.40 | 4.07 | 0.37 | 0.37 |
| 5 | 5.48 | 5.48 | 0.45 | 0.45 |

As previously discussed, the planner is preferably implemented in software such as with an objected oriented language. In the preferred embodiment, the software has been written in Smalltalk which is run on the Unix-based Sun workstation. This system utilizes a Sparc microprocessor.

Figure 6:
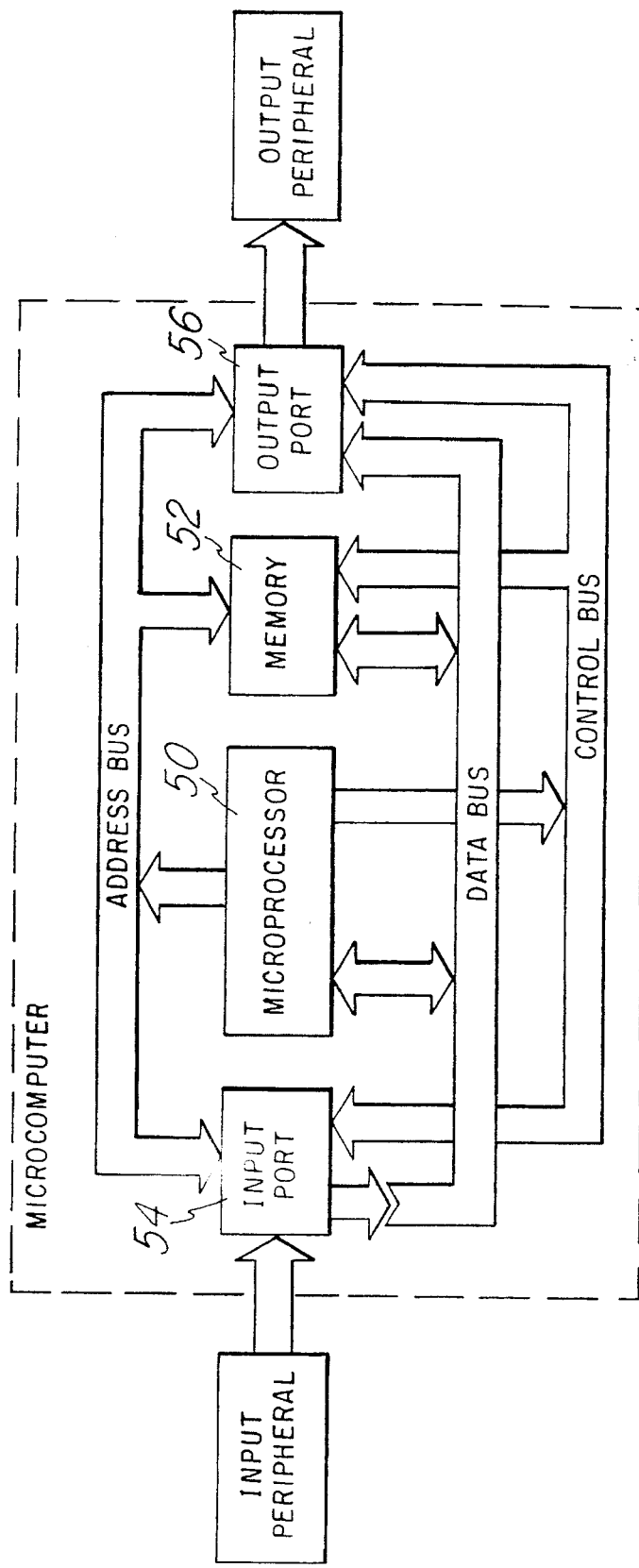
FIG. 6 illustrates a basic microcomputer block diagram which can be used to implement the present invention.

In general, any computer system can be used. A basic microcomputer system is illustrated in simplified block diagram form in FIG. 6. Here, the microprocessor 50 performs the calculations and controls the overall data transfer. The microprocessor may be a single chip or include multiple chips. Peripheral chips such as co-processors are considered part of the microprocessor 50 for the purpose of this invention.

The data is stored in memory block 52. The memory can comprise a random access memory such as a dynamic random access memory (DRAM), a static random access memory (SRAM) or a non-volatile memory such as an erasable programmable read-only memory (EPROM). Fixed data can be stored in a read-only memory.

The microprocessor system can communicate with the outside world (e.g. humans or other computers) via input port 54 and output port 56. Implementation of these interfaces are well known in the art.

As previously discussed, the specific system used is not critical to the present invention. For example, the microprocessor can be based on a Sparc or other RISC (reduced instruction set computer) systems such as the Intel 80860, the Motorola M88000, the AMD 29000 or the IBM RS/6000. Alternatively, a complex instruction set computer (CISC) based system can be used. For example a 80×86, or 68000 based system can be used. As previously stated, the operating system and programming language are not critical to the present invention.

In summary, in one aspect the present invention provides a method for planning a production schedule within a factory. A capacity model is determined for the factory by determining a plurality of contiguous time intervals, partitioning the factory into a plurality of resource groups, and determining a processing capacity for each of the resource groups for each of the time intervals. For each job to be planned, the job is divided into a plurality of processing segments each of which is represented with a corresponding fuzzy set. The fuzzy set representations are inserted and removed within the capacity model until the job is planned. After all the jobs are planned, a completion date and a confidence level can be predicted. Each of the jobs can then be released to the factory and devices may be fabricated to requirements of the jobs.

While this invention has been described with reference to illustrative embodiments, this description is not intended to be construed in a limiting sense. Various modifications and combinations of the illustrative embodiments, as well as other embodiments of the invention, will be apparent to persons skilled in the art upon reference to the description. It is therefore intended that the appended claims encompass any such modifications or embodiments.

What is claimed is:

1. A method for planning a production schedule within a factory comprising the steps of:
   determining a capacity model for said factory, said step of determining said capacity model comprising the steps of:
   determining a plurality of contiguous time intervals;
   partitioning said factory into a plurality of resource groups; and
   determining a processing capacity for each of said resource groups for each of said contiguous time intervals;
   for each job to be planned, dividing said job into a plurality of processing segments;
   representing each of said processing segments with a corresponding fuzzy set;
   inserting and removing said fuzzy set within said capacity model until said job is planned; and
   predicting a completion date and a confidence level for each of said jobs.

2. The method of claim 1, wherein said method further comprises the steps of:
   releasing said job to said factory; and
   fabricating devices within said factory according to requirements of said job.

3. The method of claim 2, wherein said method further comprises the step of fabricating semiconductor wafers.

4. The method of claim 1, wherein said method further comprises the step of substantially equaling said time intervals.

5. The method of claim 1, wherein said partitioning step comprises the step of placing a single machine into at least two resource groups.

6. The method of claim 1, wherein the step of representing each of said processing segments with a corresponding fuzzy set comprises the step of decomposing a final cycle time probability distribution into interval cycle time distributions for each successive time interval of said time intervals.

7. The method of claim 6, wherein said method further comprises the step of increasing a variance of said interval cycle time distributions in accordance with said successive time interval.

8. The method of claim 6, wherein said method further comprises the step of bounding each of said interval cycle time distributions by said final cycle time probability distribution.

9. The method of claim 6, wherein said decomposition step comprises the step of performing standard fuzzy arithmetic operations to decompose said final cycle time probability distribution.

10. The method of claim 1, wherein said inserting and removing step comprises the step of performing a modified beam search with chronological back-tracking.

11. The method of claim 10, wherein the step of performing a modified beam search comprises the step of determining a maximum value of a beam width by a ratio of measured job cycle to a minimum theoretical cycle time.

12. The method of claim 10, wherein the step of performing comprises the step of constraining said beam width to increase linearly with search depth.

13. A system for planning a production schedule within a factory comprising:

circuitry for determining a capacity model for said factory;

a memory device for storing said capacity model;

circuitry for dividing a job to be planned into a plurality of processing segments;

circuitry for representing each of said processing segments with a corresponding fuzzy set;

circuitry for inserting and removing said fuzzy set within said capacity model until said job is planned; and circuitry for predicting a completion date and a confidence level for said job.

14. The system of claim 13, wherein said memory device comprises a random access memory.

15. The system of claim 13, wherein said factory comprises a plurality of machines and said machines are partitioned into a plurality of resource groups.

16. The system of claim 15, wherein a machine of said plurality of machines is placed into at least two of said resource groups.

17. The system of claim 13, wherein said system is implemented in a microcomputer.

18. The system of claim 17, wherein said microcomputer comprises a reduced instruction set computer.

19. The system of claim 18, wherein said microcomputer comprises a Sparc microprocessor.

* * * * *